(12) United States Patent
Dalibard et al.

(10) Patent No.: US 10,576,632 B2
(45) Date of Patent: Mar. 3, 2020

(54) STANDBY MODE OF A HUMANOID ROBOT

(71) Applicant: SOFTBANK ROBOTICS EUROPE, Paris (FR)

(72) Inventors: Sébastien Dalibard, Paris (FR); Alexandre Mazel, Le Kremlin Bicetre (FR); Cyrille Collette, Le Plessis Robinson (FR); Bruno Maisonnier, Paris (FR); Jérôme Monceaux, Paris (FR)

(73) Assignee: SOFTBANK ROBOTICS EUROPE, Paris (FR)

( * ) Notice: Subject to any disclaimer, the term of this patent is extended or adjusted under 35 U.S.C. 154(b) by 0 days.

(21) Appl. No.: 15/311,739

(22) PCT Filed: Jun. 5, 2015

(86) PCT No.: PCT/EP2015/062537
§ 371 (c)(1),
(2) Date: Nov. 16, 2016

(87) PCT Pub. No.: WO2015/185709
PCT Pub. Date: Dec. 10, 2015

(65) Prior Publication Data
US 2017/0080564 A1    Mar. 23, 2017

(30) Foreign Application Priority Data

Jun. 5, 2014    (EP) .................................... 14305847

(51) Int. Cl.
*B25J 9/16*    (2006.01)
*B60N 3/00*    (2006.01)
(Continued)

(52) U.S. Cl.
CPC ........... *B25J 9/1674* (2013.01); *B25J 9/1656* (2013.01); *G06N 3/008* (2013.01); *B25J 19/0054* (2013.01)

(58) Field of Classification Search
CPC ...... B25J 9/1656; B25J 9/1664; B25J 9/1669; B25J 9/1674; B25J 9/1679; B25J 9/1694; B25J 9/0006; B25J 19/0054; G06N 3/008
See application file for complete search history.

(56) References Cited

U.S. PATENT DOCUMENTS 7,113,848 B2    9/2006  Hanson
2003/0114959 A1   6/2003  Sakamoto et al.
(Continued)

FOREIGN PATENT DOCUMENTS

CN          1982002 A       6/2007
CN        201304244 Y       9/2009
(Continued)

*Primary Examiner* — Spencer D Patton
(74) *Attorney, Agent, or Firm* — Baker & Hostetler LLP

(57) ABSTRACT

A computer-implemented method of executing a standby mode for a robot, comprises the steps of measuring one or more parameters associated with one or more parts of the robot (e.g. the temperature of one or more motors); receiving one or more standby optimization rules associated with the parameters (e.g. maximizing the dissipation of the heat of the motor), and executing one or more received standby optimization rules (e.g. executing a body animation to cool down motors). The monitored parameters comprise motor temperature measures and/or energy consumption values and/or values quantifying signs of wear. Optimization rules comprise the minimization of the consumption of energy and/or the minimization of wear and/or the maximization of the dissipation of the heat. In developments, a predefined animation can be associated a valuable social engagement score. Further aspects are disclosed, including the optional (Continued)

use of accessories. System aspects and computer programs are described.

8 Claims, 2 Drawing Sheets

(51) Int. Cl.
*G06N 3/00* (2006.01)
*B25J 19/00* (2006.01)

(56) References Cited

U.S. PATENT DOCUMENTS

| | | |
|---|---|---|
| 2006/0009878 A1 | 1/2006 | Kobayashi et al. |
| 2006/0128261 A1* | 6/2006 | Kawabe ............... B25J 19/0054 446/268 |
| 2007/0150107 A1 | 6/2007 | Ogawa et al. |
| 2008/0127446 A1 | 6/2008 | Ziegler et al. |
| 2008/0282062 A1 | 11/2008 | Montvelishsky et al. |
| 2010/0057253 A1 | 3/2010 | Kwon et al. |
| 2011/0224827 A1* | 9/2011 | Andoh ................. B62D 57/032 700/258 |
| 2012/0158174 A1 | 6/2012 | Moon et al. |
| 2014/0125678 A1* | 5/2014 | Wang ................... A63F 13/005 345/473 |

FOREIGN PATENT DOCUMENTS

| | | |
|---|---|---|
| EP | 0269373 A2 | 6/1988 |
| JP | 2002-36153 A | 2/2002 |
| JP | 2002-96283 A | 4/2002 |
| JP | 2005-161450 A | 6/2005 |
| JP | 2006-181648 A | 7/2006 |
| JP | 2007-61962 A | 3/2007 |
| JP | 2007-69302 A | 3/2007 |
| JP | 2007-190641 A | 8/2007 |
| JP | 2008-296308 A | 12/2008 |
| JP | 2010-149255 A | 7/2010 |
| JP | 2010-162663 A | 7/2010 |
| JP | 2010193694 A * | 9/2010 |
| JP | 2013-255860 A | 12/2013 |
| JP | 2014-62235 A | 4/2014 |
| WO | 2011/106543 A1 | 9/2011 |

* cited by examiner

US 10,576,632 B2

STANDBY MODE OF A HUMANOID ROBOT

CROSS-REFERENCE TO RELATED APPLICATIONS

This application is a National Stage of International patent application PCT/EP2015/062537, filed on Jun. 5, 2015, which claims priority to foreign European patent application No. EP 14305847.7, filed on Jun. 5, 2014, the disclosures of which are incorporated by reference in their entirety.

TECHNICAL FIELD

This patent relates to the field of data processing and more particularly to standby modes of a robot.

BACKGROUND

Personal computers (e.g. laptops, tablets, smartphones, etc) and robots (e.g. humanoid robots) are very different objects.

The man-machine interaction with a robot (for example with a companion humanoid robot) is very different than interactions with a personal computer. Companion robots advantageously can establish an emotional relationship with human beings, with interactive dialogs and physical actions performed in the tangible reality.

Standby methods known in the technical field of personal computing are not well adapted to robots, and a fortiori to humanoid robots.

There is a need for methods and systems of specific standby modes for robots.

SUMMARY

There is disclosed a computer-implemented method of executing a standby mode for a robot, comprising the steps of measuring one or more parameters associated with one or more parts of the robot (e.g. the temperature of one or more motors); receiving one or more standby optimization rules associated with said parameters (e.g. maximizing the dissipation of the heat of the motor), and executing one or more received standby optimization rules (e.g. executing a body animation to cool down motors). The monitored parameters comprise motor temperature measures and/or energy consumption values and/or values quantifying signs of wear. Optimization rules comprise the minimization of the consumption of energy and/or the minimization of wear and/or the maximization of the dissipation of the heat. In developments, a predefined animation can be associated a valuable social engagement score.

Further aspects are disclosed, including the optional use of accessories. System aspects and computer programs are also described.

BRIEF DESCRIPTION OF DRAWINGS

Embodiments of the present invention will now be described by way of example with reference to the accompanying drawings in which like references denote similar elements, and in which.

DETAILED DESCRIPTION

Humanoid robots are an emerging form of "social technology". As companion robots, humanoid robots are increasingly considered as partners by human users, maintaining a durable if not emotional relationship and continuously learning (from each other, i.e. robots learning from users and vice-versa). For example, and even if being only machines, personal robots present a great value for coaching activities (e.g. diet, sport or education). Compared to personal computers, simulated emotions and body language allow for more engaging, persuasive, convincing or otherwise trustful relationships.

Humanoid robots are information processing machines and therefore a wide range of comparisons with personal computers can be established. Some aspects can be considered common ground. Some other aspects are very different when comparing personal robots and personal computers.

For example, regarding the aspect of "software applications", some quite substantial differences can be briefly underlined. A first significant difference lies in the multi-modal characteristics of a personal robot, i.e. by design. A companion robot can follow its owner (i.e. present displacement capabilities) and can touch objects or interact with its environment. By design, a personal computer is lacking such various environmental feedbacks. This "multimodal" feature or characteristics implies deep consequences regarding the management of applications on the robot (among other aspects, e.g. including the management of standby modes).

A particular difference relates to the handling of standby modes, wherein in addition to energy savings aspects, a robot can incidentally and/or opportunistically and/or on-purpose evaluate, select and further execute different animations or sequences of movements. Such animations or motions for example can cool down motors and/or enable system verifications, while maintaining or developing the relationship with human users ("user experience").

Figure 1:
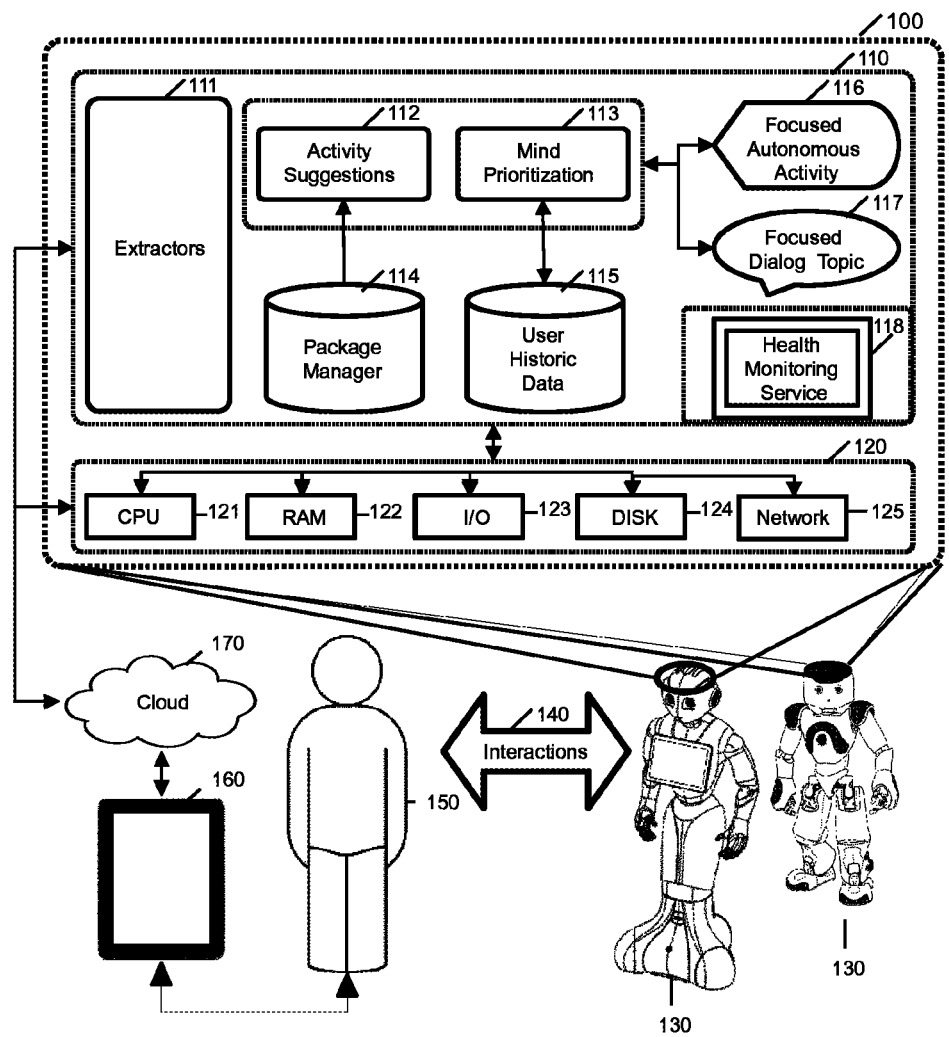
FIG. 1 illustrates the global technical environment of the invention.

The FIG. 1 illustrates the global and technical environment of the invention. A robot 130 comprises sensors and actuators. A logic or "mind" 100 is implemented in the robot or associated with it (for example remotely) and comprises a collection of software 110 and hardware components 120. The robot 130 is interacting (by bilateral or two-ways communications 140, including one or more dialog sessions) with one or more users 150. Said one or more users can access other computing devices 160 (for example a personal computer such as a wearable computer or a smartphone or a tablet), which can be connected devices (in communication with a cloud of servers and/or a fleet of other robots or connected objects, etc). In particular, a connected device can be a wearable computer (e.g. watch, glasses, immersive helmet, etc).

The specific robot 130 on the figure is taken as an example only of a humanoid robot in which the invention can be implemented. The lower limb of the robot on the figure is not functional for walking, but can move in any direction on its base which rolls on the surface on which it lays. The invention can be easily implemented in a robot which is fit for walking.

In some embodiments of the invention, the robot can comprise various kinds of sensors. Some of them are used to control the position and movements of the robot. This is the case, for instance, of an inertial unit, located in the torso of the robot, comprising a 3-axis gyrometer and a 3-axis accelerometer. The robot can also include two 2D color RGB cameras on the forehead of the robot (top and bottom). A 3D sensor can also be included behind the eyes of the robot. The robot can also optionally comprise laser lines generators, for instance in the head and in the base, so as to be able to sense its relative position to objects/beings in its environment. The robot can also include microphones to be capable of sensing sounds in its environment. The robot of the invention can also include sonar sensors, possibly located at the front and the back of its base, to measure the distance to objects/human beings in its environment. The robot can also include tactile sensors, on its head and on its hands, to allow interaction with human beings. It can also include bumpers on its base to sense obstacles it encounters on its route. To translate its emotions and communicate with human beings in its environment, the robot of the invention can also include LEDs, for instance in its eyes, ears and on its shoulders and loudspeakers (for example located in its ears). The robot can communicate with a base station, with other connected devices or with other robots through various networks (3G, 4G/LTE, Wifi, BLE, mesh, etc). The robot comprises a battery or source of energy. The robot can access a charging station fit for the type of battery that it includes. Position/movements of the robots are controlled by its motors, using algorithms which activate the chains defined by each limb and effectors defined at the end of each limb, in view of the measurements of the sensors.

In a specific embodiment, the robot can embed a tablet with which it can communicate messages (audio, video, web pages) to its environment, or receive entries from users through the tactile interface of the tablet. In another embodiment, the robot does not embed or present a screen but it does have a video projector, with which data or information can be projected on surfaces in the vicinity of the robot. Said surfaces can be flat (e.g. floor) or not (e.g. deformations of the projecting surfaces can be compensated to obtain a substantially flat projection). In both embodiments (with screen and/or with a projector), embodiments of the invention remain valid: the claimed interaction model is only supplemented or complemented by visual interaction means. In any case, would the graphical means be out of order or deactivated on purpose, the conversational mode of interaction remains.

In an embodiment, the robot does not comprise such graphical user interface means. Existing humanoid robots are generally provided with advanced speech capabilities but are generally not provided with GUI. Increasing communities of users will probably not use graphical means (e.g. tablet, smartphone), even as a complement, to communicate with the robot, by choice and/or necessity (young people, impaired persons, because of a practical situation, etc).

The collection of software 110 (non-exhaustively) comprises software modules or objects or software code parts, in interaction with one another, including "extractors" 111, "activity suggestions" 112, "mind prioritization" 113, "package manager" 114, "User historical data" 115, "Focused Autonomous activity" 116 and "Focused Dialog Topic" 117 and a "Health Monitoring Service" 118.

An "Extractor Service" 111 generally senses or perceives something internal or external of the robot and provides short term data into the robot's memory. An Extractor service receives input readings from the robot sensors; these sensor readings are preprocessed so as to extract relevant data in relation to the position of the robot, identification of objects/human beings in its environment, distance of said objects/human beings, words pronounced by human beings or emotions thereof. Extractor services in particular comprise: face recognition, people perception, engagement zones, waving detection, smile detection, gaze detection, emotion detection, voice analysis, speech recognition, sound localization, movement detection, panoramic compass, robot pose, robot health diagnosis, battery, QR code handling, home automation, tribes, time and schedule.

An "Actuator Service" makes the robot 130 physically do or perform actions. Motion tracker, LEDs, Behavior manager are examples of "Actuator Services".

A "Data Service" provides long-term stored data. Examples of Data Services are a User Session Service 115, which stores user data, and their history of what they have done with the robot and a Package Manager Service 114, which provides a scalable storage of procedures executed by the robot, with their high level definition, launch conditions and tags. "Package Manager" in particular provides the scalable storage of Activities and Dialogs, and the Manifest. The "Manifest" contains metadata such as launch conditions, tags, and high level descriptions.

A "Mind Service" (for example a service Mind Prioritization 113) is one that will be controlled by the robot's central "Mind" when it is initiating action. "Mind Services" tie together "Actuator services" 130, "Extractor services" 111 and "Data services" 115. Basic Awareness is a "Mind Service". It subscribes to "Extractor Services" such as People perception, Movement detection, and Sound localization to tell the Motion Service to move. The "Mind" 113 configures Basic Awareness's behavior based on the situation. At other times, Basic Awareness is either acting own its own, or is being configured by a Running Activity.

"Autonomous Life" is a Mind Service. It executes behavior activities. Based on the context of a situation, the Mind can tell autonomous life what activity to focus ("Focused Autonomous Activity" 116). Metadata in manifests tie this information into the mind. Any activity can have access to one or more of the Operating System APIs. Activities can also directly tell Autonomous Life what activity to focus, or tell the Dialog Service what topic to focus on.

The "Dialog" service can be configured as a Mind Service. It subscribes to the speech recognition extractor and can use "Animated Speech Actuator Service" to speak. Based on the context of a situation, the Mind can tell the Dialog what topics to focus on (a "Dialog Topic"). The "Dialog" service also has its algorithms for managing a conversation and is usually acting on its own. One component of the Dialog service can be a "Focused Dialog Topic" service 117. Dialog Topics can programmatically tell the Mind to switch focus to (or execute or launch) a different Activity or Dialog Topic, at any time. One example of possible method to determine the Dialog Topic can comprise: at the moment that an dialog topic or activity's launch conditions become true or false, a list of all possible Activities or Dialog Topics for the moment is sent to the Mind; the list is filtered according to activity prioritization; the list order is randomized; the list is sorted (or scored) to give precedence to Activities or Dialog Topics that are "unique" and have been started less often; a special check to make sure the top Dialog Topic or Activity in this list isn't the same activity as the previous activity that was executed. The list can be again sorted and filtered according to the preferences of the user.

The robot can implement a "health monitoring" service 118. Such a service can act as a daemon or a "watchdog", to review or control or regulate the different priorities of the robot. Such a service can monitor (continuously, intermittently or periodically) the status of the internal components of the robot and measure or anticipate or predict or correct hardware failures. In a development, the fleet (e.g. installed base) of robots is monitored. The embedded service can continuously detect faulty situations and synchronize them with a "cloud" service (once every minute for example). In some embodiments, the "health monitoring" service 118 can contribute, if not lead, the different standby modes disclosed hereafter.

Hardware components 120 comprise processing means 121, memory means 122, Input/Output I/O means 123, mass storage means 124 and network access means 125, said means interacting with one another (caching, swapping, distributed computing, load balancing, etc). The processing means 121 can be a CPU (multicore or manycore) or a FPGA. The memory means 122 comprise one or more of a flash memory or a random access memory. The I/O means 123 can comprise one or more of a screen (e.g. touch screen), a light or LED, a haptic feedback, a virtual keyboard, a mouse, a trackball, a joystick or a projector (including a laser projector). The storage means 124 can comprise one or more of a hard drive or a SSD. The network access means can provide access to one or more networks such as a 3G, 4G/LTE, Wifi, BLE or a mesh network. Network traffic can be encrypted (e.g. tunnel, SSL, etc).

In an embodiment, computing resources (calculations, memory, I/O means, storage and connectivity) can be remotely accessed, for example as a complement to local resources (available in the robot itself). For example, further CPU units can be accessed through the Cloud for voice recognition computing tasks. Computing resources also can be shared. In particular, a plurality of robots can share resources. Connected devices in the vicinity of the robot also can share resources to some extent, for example via secured protocols. Display means also can be shared. For example, the television can be used as a further display by the robot when passing by.

Figure 2:
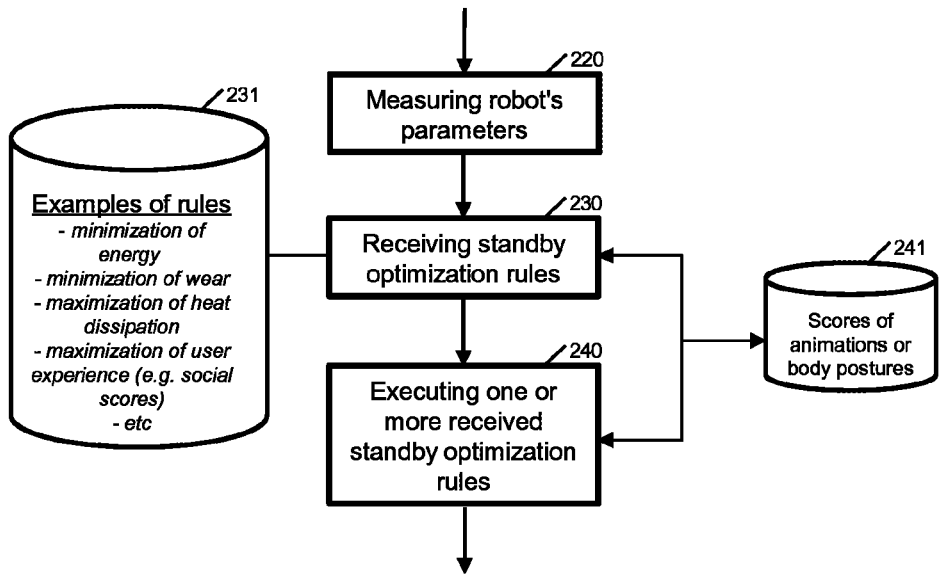
FIG. 2 details some aspects of an embodiment of the method.

The FIG. 2 details some aspects of an embodiment of the method.

There is disclosed a computer-implemented method of executing a standby mode for a robot, comprising the steps of measuring 220 one or more parameters associated with one or more parts of the robot (e.g. the temperature of one or more motors); receiving 230 one or more standby optimization rules associated with said parameters (e.g. maximizing the dissipation of the heat of the motor), and executing 240 one or more received standby optimization rules (e.g. executing a body animation to cool down motors).

The monitored parameters at step 220 comprise motor temperature measures and/or energy consumption values and/or values quantifying signs of wear.

Examples of optimization rules 231 comprise the minimization of the consumption of energy and/or the minimization of wear and/or the maximization of the dissipation of the heat.

In a development, for example as a result of the step of executing 240 one or more received standby optimization rules, a predefined animation can be played by the robot. Said animation can be associated with a high score (user-friendly attitude, "social engagement"). This criterion can be measured afterwards, but also can be taken account upstream in order to select which animation to execute.

Detailed embodiments and developments are now discussed.

There is disclosed a computer-implemented method of executing a standby mode in or by a robot, comprising the steps of measuring one or more parameters associated with one or more parts of the robot; receiving one or more standby optimization rules associated with said parameters, and executing one or more received standby optimization rules.

Events and/or parameters associated with one or more parts of the robot are continuously (or intermittently or periodically) monitored (e.g. watchdog or daemon executing on the robot itself or on/by some other connected devices or robots).

Parts of the robot comprise articular chains (arm, hand, leg, foot or head for example) and its associated motors, for example located at articular locations (wrist, elbow, shoulder, knee, ankle, neck, pelvis, etc).

Standby optimization rules can be stored locally or accessed through a network. Rules can be predefined or not. Rules can be static or dynamically defined. In some embodiments, rules can depend on the set of monitored parameters. Rules can also be defined by the user, at least partly (behavior type, energy saving profile, etc), or be defined by the manufacturer or the seller of the robot.

Depending on the combination of the monitored parameters (e.g. perimeter, values, thresholds), particular rules can be applied. In some embodiments, these rules can aim to optimize the system status of the robot (e.g. check system parts, cool down motors, etc) and/or (i.e. in combination or alternatively) to adopt a user-friendly attitude (e.g. socially engaging posture or animation).

Figure 3:
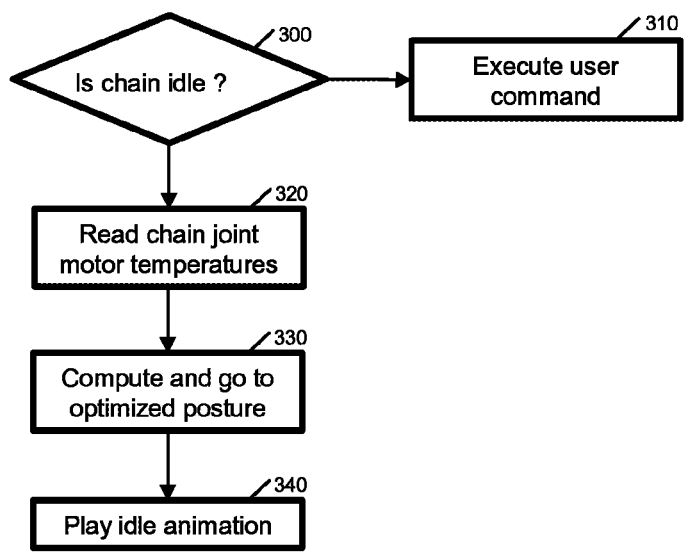
FIG. 3 details some particular aspects of a specific embodiment of the method.

In a particular embodiment described FIG. 3, when no user motion command is sent to an articular chain, it can be considered idle 300 (for example upon excess or below some predefined thresholds). If not, a user or software program command 310 is executed. If the chain is considered "idle", the motion controller can check the current temperature of the motors of the chain at step 320, and according to some embodiments can choose an idle or resting posture 330 for that chain, thereby and for example minimizing the power consumption of the hottest joints. In an embodiment, as long as the chain is detected of assessed as idle, the motion controller can optionally play a "safe" animation 340, e.g. have to robot to execute a slow animation (at low speed, with low energy consumption).

Different activations or deactivations of the robot ("states" or "modes") are now described. A robot can enter or leave different machine states (generally referred to as "standby"): hibernation state, sleep state or mode, or otherwise idle state. In particular, these particular states can be designed or adapted so that to optimize system parameters.

The companion robot when unsolicited or otherwise inactive can remain in certain resting or standby states or modes, sometimes analogous to computer systems, to restore its abilities and/or cool down its motors and/or perform checkup tasks and/or save energy and/or to appear quiet. Different modes or states are possible. By decreasing energy consumption levels, the robot can "actively standby", "standby", "hibernate", "sleep" or "power off" (the terminology can change, different combinations of deactivated internal circuits being possible).

In some embodiments, for example, the "active standby" mode can mean that the robot powers off a selected but limited number of internal components to save energy. Waking up times delays generally very short. The "standby" mode increases the number of inactive components, and waking-up delays can be increased. The hibernation means that the robot remains ready for a prompt (i.e. rapid or fast) waking up, saving energy by shutting down selected processes, while maintaining a subset of other ones. For example, the robot may maintain its computer vision or at least its microphones. The module called "basic awareness"

generally is maintained in active state at all times. In the "sleep" mode, the robot can power off almost entirely, for example adopting a resting posture, suitable for stable equilibrium, and saving energy. The "shutting down" process in some embodiments is tightly controlled. In particular, it can serve to diagnose the state of the robot. Symmetrically, the "booting-up" (or starting-up) process performs a series of predefined tasks, which diagnoses possible malfunctions.

In some embodiments, a logical software supervisor continuously runs in the background (e.g. the "Basic Awareness" software module of the robot's operating system) and performs said resting and/or standby optimization steps.

In a development, the one or more parameters comprise temperature measures and/or energy consumption values and/or values quantifying signs of wear or combinations thereof.

Monitored parameters can comprise parameters such as the temperature (or heat) of the different motors (for example located at articular locations, as measured or as computed or simulated) and/or the measured or estimated wear levels (affecting the longevity and maintenance of the robot) and/or the measured or estimated remaining levels of energy (or battery management parameters). A hierarchy of parameters can be defined. In general, temperature (e.g. of motors) is a critical parameter (short term). Energy consumption has an effect versus battery life. Signs of wear have a long-term impact. The definition of the perimeter of such parameters and the knowledge of their values (measured or simulated/estimated or accessed from external sensors) can contribute to the global management of the robotic system.

There are further disclosed specific aspects of such states of the robot, i.e. when not fully awakened. In particular, there is disclosed that one or more of these particular states can be handled in such a way that to recover and/or repair and/or restore and/or diagnose the health status of the robot. The following minimization (or maximization) operations can be of local perimeter (e.g. one or more parts of the robot) or of global perimeter (e.g. considering the robot in whole).

In a development, an optimization rule comprises a rule of minimization of the consumption of energy.

In a development, for example when no specific software application is executing on the robot, the energy consumption of the motor can be optimized, sometimes without stopping completely the robot. A complete shut down may present the risk of not being able to reboot one or more motors of the robot. In some cases, it thus can be wise not to stop entirely at least some parts of the robot, i.e. it is advantageous to maintain the robot in some specific idle states.

In a development, an optimization rule comprises the minimization of wear of one or more parts of the robot.

Some resting attitudes for example can counterbalance past or current mechanical efforts. Parts provided with lubricant (if any) can be appropriately handled according to the described method.

In a development, an optimization rule comprises the maximization of the dissipation of the heat of one or more motors of the robot.

Idle animations can incidentally cool down the motors of the robot. Animations also can be specifically designed to cool down parts and/or to optimize cooling in view of local conditions (and to spare energy as well, in some embodiments). For example, in order to cool the shoulders of the robot, the arms may move slightly back and forth (and then fall down by gravity, saving energy). Additional sensors (e.g. an anemometer, embedded or remotely accessed) can help the robot to decide which animations to execute (for example to take advantage from a particular local air flow).

In a development, the step of executing an optimization rule comprises a step of executing an animation or predefined motion of one or more parts of the robot.

An animation is a sequence of motions or movements. Motions are movements in space (i.e. displacements of one or more parts of the robot), e.g. correspond to "body language" in some embodiments. An animation can be further associated with the communication of sounds and/or visual effects (voice synthesis, blinking, flashing lights if any, display or projection of of information, etc).

In an embodiment, an animation can be predefined, i.e. the geometry is entirely predefined. In another embodiment, an animation is rule-based, i.e. rules of movement are deterministic and predefined but the exact sequence performed in the reality can depend on other external factors (collisions or risks of collision with obstacles, measured temperature of motors, temperature of the room, applauds, emotions of the attending audience etc). Rules aim at reaching a compromise between restoring the parts of the robot (e.g. cooling down parts, testing proper functions, evaluate damages or wears, etc) and energy savings (testing functions cost energy and tests can be applied incidentally or opportunistically when performing other tasks).

In an embodiment, these animations are performed at low speeds (and/or low intensity), i.e. at low energy. A part of the robot can combine motions (pitch, roll, yaw), for example at low intensity/velocity. For example, animations can comprise one or more of the motions comprising rocking, swinging, swaying, balancing (e.g. an arm or a leg or the torso), dancing (e.g. coordinated movements of low amplitude), counterbalancing, poising, breathing, body rocking, shaking, trembling, moon-walking, kneeling down, noding, chewing (or equivalent) and combinations thereof. For example, in idle state, the robot can slightly shake its head in rhythm (e.g. as if listening to music). Additionally the robot can emit sounds to mimic yawning or snoring or sighing. Further specific standby embodiments are described.

In an embodiment, the head of the robot remains permanently active (i.e. substantially).

In some embodiments, slow body animations are advantageously socially engaging, e.g. invites users for interaction. When standing up, the robot for example can move its center of gravity from one leg to another (to spare constraints), while imitating human behaviors.

The resting state of the robot is a known initial state: developers of software applications can know the starting parameters of the robot when booting it up. In other words, software developers do not have to worry about the state of the robot when starting the execution of a software application (e.g. an activity). The described operations monitor and/or continuously correct the state of the different parts of the robot, ensuring that the robot is fully functional and/or its status is known at any moment.

Advantageously, motors (e.g. at articular locations) can be cooled down by specific animations. Depending on which motors are excessively hot, certain positions or attitude can be selected, minimizing constraints. In an embodiment, the robot can perform movements of low amplitude, which advantageously optimize the cooling down of internal parts such as heated motors. In an embodiment, these movements or gestures or oscillations can be specifically designed to recover (e.g. cool down or optimize or repair or restore) problematic parts (e.g. over-heated or damaged) of the robot.

In a development, a predefined motion is associated with a body posture associated with a social engagement score exceeding a predefined threshold.

The animation which is planned for execution can be similar to a static (or dynamic) body posture or language whose "user-friendliness" (or "social engagement score") can be known (e.g. scored) in advance. For example crossing one's legs is less engaging than giving a hand.

Advantageously, a "slow" animation can make the robot to appear "alive", i.e. inviting a user for interaction. In some embodiments, the animation can mimic a "breathing" state. Such a posture signals to users that the robot is still active and is ready for interaction, even if no particular software program or activity (e.g storytelling, weather reporting, dancing, etc) is executing on the robot. In other words, in some embodiments, the human attitude can be an incident advantage. In some other embodiments, the mimic of a human opened posture (e.g. social attitude or body language calling for interaction) can be fully part of the decision model. In some cases, it may well happen that the requirements derived from states of the mechanical and/or electrical parts of the robot cannot be congruent (i.e. married, or combined) with such socially engaging postures. In such cases, the robot has to restore or recover or restart or otherwise repair its components first.

The "idle animations" or "resting movements" or otherwise predefined motions an correspond to system's optimizations (incidentally or on purpose). If a candidate system optimization additionally results in a positive "social" attitude or appeal, the acceptance or ponderation or weighing associated with said candidate optimization can be increased (for example). Alternatively, user feedbacks and experiences can modify—if not lead—"standby" or "hibernation" or "sleep" mode states.

In some embodiments, the optimization criterion is associated with the status of the system and its subsystems. In some embodiments, the optimization criterion is associated with the social engagement. In some embodiments, both types of criterion (system optimization and mimic of social interaction) can be used simultaneously (or concurrently in some embodiments).

In a development, the method further comprises executing said predefined motion or animation.

In a development, the execution of the predefined motion is enhanced or enabled by an active accessory.

In an embodiment, external devices such as "intelligent" clothes can be worn by the robot. For example, enhanced clothes can both help to cool down the robot at selected points, while simulating living artifacts (e.g. pneumatic system to simulate breathing, engaging or inviting for interaction). Accessories can be passive but also active: fans embedded in clothes or appropriate apertures can facilitate the air low or circulation and further cool down the required part of the robot.

In a development, one or more optimization rules are locally predefined or retrieved from a distant server.

In an embodiment, the robot is autonomous (rules are hard coded or otherwise embedded in the robot without the need of a network connection). In another embodiment, the robot is controlled or influenced by data retrieved from a distant server (e.g. the "Cloud"). In yet another embodiment, optimization rules are partly local and partly remotely accessed.

There is disclosed a computer program comprising instructions for carrying out one or more steps of the method when said computer program is executed on a suitable computer device.

There is disclosed a system comprising means adapted to carry out one or more steps steps of the method.

The disclosed methods can take form of an entirely hardware embodiment (e.g. FPGA), an entirely software embodiment or an embodiment containing both hardware and software elements. Software embodiments include but are not limited to firmware, resident software, microcode, etc. The invention can take the form of a computer program product accessible from a computer-usable or computer-readable medium providing program code for use by or in connection with a computer or any instruction execution system. A computer-usable or computer-readable can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium.

The invention claimed is:

1. A method of executing a standby mode in a humanoid robot, comprising the steps of:
    measuring one or more parameters associated with one or more parts of the robot;
    receiving a standby optimization rule associated with said parameters, the standby optimization rule comprises the maximization of the dissipation of the heat of one or more motors of the robot, and
    executing the received standby optimization rule,
    wherein executing the received standby optimization rule comprises executing an animation or predefined motion of the one or more parts of the robot, said animation or predefined motion comprising a breathing motion.

2. The method of claim 1, wherein the one or more parameters comprise at least one of temperature measures, energy consumption values, and values quantifying signs of wear.

3. The method of claim 1, further comprising receiving another standby optimization rule that comprises a rule of minimization of the consumption of energy.

4. The method of claim 1, further comprising receiving another standby optimization rule that comprises the minimization of wear of one or more parts of the robot.

5. The method of claim 1, wherein said animation or predefined motion is a predefined motion that is associated with a body posture associated with a social engagement score exceeding a predefined threshold.

6. The method of claim 1, wherein the execution of the predefined motion or animation is enhanced or enabled by an active accessory.

7. The method of claim 1, wherein the standby optimization rule is locally predefined or retrieved from a distant server.

8. A computer program, stored on a non-transitory computer readable medium, comprising instructions that when executed on a suitable computer device cause the suitable computer device to automatically carry out a method of executing a standby mode in a humanoid robot, the method comprising the steps of:
    measuring one or more parameters associated with one or more parts of the robot;
    receiving a standby optimization rule associated with said parameters, the standby optimization rule comprises the maximization of the dissipation of the heat of one or more motors of the robot, and
    executing the received standby optimization rule,
    wherein executing the received standby optimization rule comprises executing an animation or predefined motion of the one or more parts of the robot, said animation or predefined motion comprising a breathing motion.

\* \* \* \* \*